Patented Mar. 1, 1938

2,109,492

UNITED STATES PATENT OFFICE 2,109,492

CARBANILIC ACID DERIVATIVES

William A. Lott, Newark, N. J., and William Braker, Brooklyn, N. Y., assignors to E. R. Squibb & Sons, New York, N. Y., a corporation of New York No Drawing. Application August 30, 1933, Serial No. 687,482

7 Claims. (Cl. 260—105)

This invention relates to, and has for its object the provision of, certain carbanilic acid derivatives and an intermediate compound.

Compositions of this invention comprise compounds having the general formula $$XNHCOORN\begin{matrix}Y\\Z\end{matrix}$$

wherein X is phenyl or substituted phenyl, R is an alkylene, Y is an alkyl or an aralkyl, and Z is an alkyl or an aralkyl, different from Y, which compounds may be prepared by reacting $$HORN\begin{matrix}Y\\Z\end{matrix}$$

with

XNCO (or with

XNCCl$_2$ under conditions in which it is stable), R, X, Y, and Z having here the same signification as above; the salts, especially the borates and the hydrochlorides, thereof; and the intermediate beta-(N-normal-amyl N-ethyl amino)-ethanol.

Examples

1. Beta-(N-normal-amyl N-ethyl amino)-ethyl carbanilate hydrochloride, $$C_6H_5NHCOOCH_2CH_2N\begin{matrix}C_2H_5\\C_5H_{11}\end{matrix}\ .HCl$$

11 g. of normal-amyl ethyl amine (which may be prepared by the method of Carothers, J. A. C. S. 49, 2913), 12 g. of anhydrous potassium carbonate, and 8 g. of ethylene chlorhydrin are heated together on the steam-bath for one hour, in an oil bath at 134° C. for two hours, and at 150–155° C. for half an hour. When completion of the reaction is indicated by cessation of evolution of carbon dioxide, the mixture is extracted with ether and the extract is fractionated. There is secured beta-(N-normal-amyl N-ethyl amino)-ethanol, a colorless oil boiling at 210–213° C./760 mm.

2.3 g. of this oil and 1.72 g. of phenyl isocyanate are dissolved in 30 cc. of dry benzene and refluxed for five hours on the steam-bath; and by the addition of ether-hydrogen-chloride the desired composition is caused to separate out as a white powder having a melting point of 177–178° C.

The base is a colorless oil.

By evaporating a solution containing 3.0 g. of the base and 3.15 g. of boric acid, the borate of the base is obtained.

2. Beta-(N-methyl N-phenethyl amino)-ethyl carbanilate hydrochloride, $$C_6H_5NHCOOCH_2CH_2N\begin{matrix}CH_3\\CH_2CH_2C_6H_5\end{matrix}\ .HCl$$

6.2 g. of beta-(N-methyl N-phenethyl amino)-ethanol and 4.63 g. of phenyl isocyanate are dissolved in 50 cc. of anhydrous ether, and the solution is boiled for three hours under a reflux condenser, moisture being excluded by means of a calcium chloride tube. When the reaction is complete, the addition of a slight excess of a dry ether solution of hydrogen chloride causes the desired composition to separate immediately as a white crystalline substance, which, on being washed with dry ether, dried, and recrystallized several times from absolute alcohol, is found to have a melting point of 186–187° C.

Among the other compounds embraced by the invention are those represented by the following formulas, and their salts:

$$C_6H_5NHCOOCH_2CH_2CH_2N\begin{matrix}CH_3\\CH_2CH_2C_6H_5\end{matrix}$$

$$C_6H_5NHCOOCH_2CHN\begin{matrix}CH_3\\|\\CH_3\end{matrix}\begin{matrix}\\CH_2CH_2C_6H_5\end{matrix}$$

$$C_6H_5NHCOOCH_2CH_2N\begin{matrix}C_2H_5\\CH_2CH_2C_6H_5\end{matrix}$$

$$C_6H_5NHCOOCH_2CH_2N\begin{matrix}C_2H_5\\CHCH_2CH_2C_6H_5\\|\\CH_3\end{matrix}$$

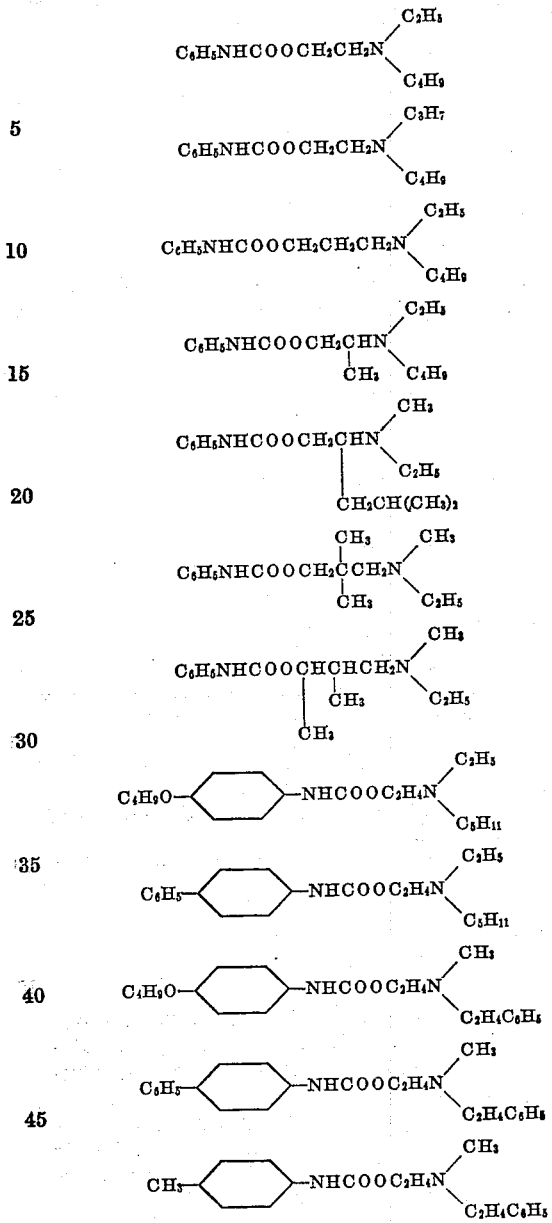

The carbanilic acid derivatives of this invention have given evidence of great value as local anesthetics. Thus beta-(N-normal-amyl N-ethyl amino)-ethyl carbanilate hydrochloride has been found to induce anesthesia without lacrimation and with practically no irritation when administered corneally, and without tissue damage when administered intradermally in 0.5% solutions.

It is to be understood that the foregoing examples are merely illustrative and by no means limitative of the invention, which may be variously otherwise embodied—as with respect to particular compounds and salts and procedures—within the scope of the appended claims.

We claim:

1. Compounds selected from the class consisting of bases having the general formula:

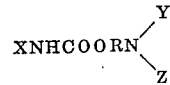

wherein X is one of the group phenyl, alkyl-phenyl, alkoxy-phenyl, and phenyl-phenyl, R is one of the group alkylene and alkylated alkylene, Y is one of the group methyl and ethyl, and Z is one of the group butyl, amyl, and phenethyl; and the inorganic acid salts thereof.

2. Compounds selected from the class consisting of bases having the general formula:

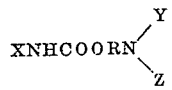

wherein X is one of the group phenyl, alkyl-phenyl, alkoxy-phenyl, and phenyl-phenyl, R is one of the group ethylene and alkylated ethylene, Y is one of the group methyl and ethyl, and Z is one of the group butyl, amyl, and phenethyl; and the inorganic acid salts thereof.

3. Compounds selected from the class consisting of bases having the general formula:

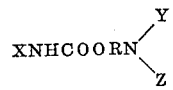

wherein X is phenyl, R is one of the group ethylene and alkylated ethylene, Y is one of the group methyl and ethyl, and Z is one of the group butyl, amyl, and phenethyl; and the inorganic acid salts thereof.

4. Compounds selected from the class consisting of the base beta-(N-normal-amyl N-ethyl amino)-ethyl carbanilate and its inorganic acid salts.

5. Beta-(N-normal-amyl N-ethyl amino)-ethyl carbanilate hydrochloride.

6. Beta-(N-normal-amyl N-ethyl amino)-ethyl carbanilate borate.

7. Beta-(N-methyl N-phenethyl amino)-ethyl carbanilate hydrochloride.

WILLIAM A. LOTT.
WILLIAM BRAKER.